United States Patent
Lydon et al.

(10) Patent No.: US 9,201,827 B2
(45) Date of Patent: Dec. 1, 2015

(54) DEVICE DEPENDENT SELECTION BETWEEN MODES FOR ASYMMETRIC SERIAL PROTOCOLS

(71) Applicant: Apple Inc., Cupertino, CA (US)

(72) Inventors: Gregory T. Lydon, Santa Cruz, CA (US); Lawrence G. Bolton, Mahomet, IL (US); Anand Dalal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/077,115

(22) Filed: Nov. 11, 2013

(65) Prior Publication Data

US 2014/0075054 A1 Mar. 13, 2014

Related U.S. Application Data

(62) Division of application No. 12/551,824, filed on Sep. 1, 2009, now Pat. No. 8,626,932.

(51) Int. Cl.
*G06F 3/00* (2006.01)
*G06F 13/38* (2006.01)

(52) U.S. Cl.
CPC ............ *G06F 13/387* (2013.01); *G06F 13/385* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,184,652 B1 | 2/2001 | Yang | |
| 6,211,649 B1 | 4/2001 | Matsuda | |
| 6,372,974 B1 | 4/2002 | Gross et al. | |
| 6,516,205 B1 | 2/2003 | Oguma | |
| 6,535,983 B1 | 3/2003 | McCormack et al. | |
| 6,653,813 B2 | 11/2003 | Khatri | |
| 6,663,420 B1 * | 12/2003 | Xiao | 439/502 |
| 6,920,569 B1 | 7/2005 | Wauters et al. | |
| 6,931,456 B2 | 8/2005 | Payne et al. | |
| 6,963,933 B2 | 11/2005 | Saito et al. | |

(Continued)

FOREIGN PATENT DOCUMENTS

| | | |
|---|---|---|
| JP | 2001-069165 | 3/2001 |
| JP | 2002-163051 A | 6/2002 |

(Continued)

OTHER PUBLICATIONS

Brown, "Making UBS Work," downloaded Oct. 16, 2001, PC Magazine: PC Tech wysiwyg:/155/http://www.zdnet.com/pcmag/pctech/content!18/04/tu1804.001.h-tml.

(Continued)

*Primary Examiner* — Elias Mamo
(74) *Attorney, Agent, or Firm* — Kilpatrick Townsend & Stockton LLP

(57) ABSTRACT

A portable communication device (PCD) can automatically switch into different operating modes of an asymmetric communication protocol (such as USB) depending on the type of accessory connected. For example, the accessory can signal whether the PCD should operate in a first mode or a second mode using a hardware indicator such as identification resistor across two pins of a multi-pin connector and/or a software indicator such as a command protocol. The PCD can detect the accessory's signal and switch to the operating mode requested by the accessory.

18 Claims, 4 Drawing Sheets

(56) References Cited

U.S. PATENT DOCUMENTS

| | | | |
|---|---|---|---|
| 7,108,560 | B1 | 9/2006 | Chou et al. |
| 7,167,935 | B2 | 1/2007 | Hellberg |
| 7,185,132 | B2 * | 2/2007 | Tang .............................. 710/305 |
| 7,193,442 | B2 | 3/2007 | Zhu |
| 7,214,089 | B1 | 5/2007 | Learmonth et al. |
| 7,215,042 | B2 | 5/2007 | Yan |
| 7,293,122 | B1 | 11/2007 | Schubert et al. |
| 7,299,304 | B2 | 11/2007 | Saint-Hilaire et al. |
| 7,441,062 | B2 | 10/2008 | Novotney et al. |
| 7,480,753 | B2 | 1/2009 | Bohm et al. |
| 7,480,758 | B2 | 1/2009 | Lin et al. |
| 7,529,872 | B1 | 5/2009 | Schubert et al. |
| 7,581,119 | B2 | 8/2009 | Tupman et al. |
| 7,583,105 | B2 | 9/2009 | Stopel et al. |
| 8,117,651 | B2 * | 2/2012 | Novotney et al. ............... 726/16 |
| 2001/0005641 | A1 | 6/2001 | Matsumoto et al. |
| 2001/0006884 | A1 | 7/2001 | Matsumoto |
| 2004/0048569 | A1 | 3/2004 | Kawamura |
| 2004/0088449 | A1 * | 5/2004 | Sakaki ............................ 710/15 |
| 2004/0103223 | A1 | 5/2004 | Gabehart et al. |
| 2004/0116005 | A1 | 6/2004 | Choi |
| 2004/0225836 | A1 * | 11/2004 | Lin .............................. 711/115 |
| 2004/0249994 | A1 | 12/2004 | Shapiro et al. |
| 2005/0268000 | A1 | 12/2005 | Carlson |
| 2006/0080490 | A1 | 4/2006 | Tang |
| 2006/0094461 | A1 | 5/2006 | Hameed et al. |
| 2006/0106962 | A1 * | 5/2006 | Woodbridge et al. ......... 710/106 |
| 2006/0123175 | A1 | 6/2006 | Yu et al. |
| 2006/0224791 | A1 | 10/2006 | Keppeler |
| 2007/0112985 | A1 * | 5/2007 | Law et al. ...................... 710/110 |
| 2007/0236482 | A1 | 10/2007 | Proctor et al. |
| 2008/0005409 | A1 | 1/2008 | Kolokowsky et al. |
| 2008/0222341 | A1 | 9/2008 | Lin et al. |
| 2008/0222438 | A1 | 9/2008 | Lin et al. |
| 2009/0037622 | A1 | 2/2009 | Dheeresh et al. |
| 2009/0185559 | A1 | 7/2009 | Chen et al. |
| 2009/0198841 | A1 | 8/2009 | Yoshida et al. |
| 2009/0300239 | A1 | 12/2009 | Hubo et al. |
| 2009/0307380 | A1 | 12/2009 | Lee et al. |
| 2011/0013624 | A1 | 1/2011 | Lerzer et al. |

FOREIGN PATENT DOCUMENTS

| | | |
|---|---|---|
| WO | WO 2004/034266 | 4/2004 |
| WO | WO 2006/107509 | 10/2006 |
| WO | WO 2007/122453 | 11/2007 |
| WO | WO 2011/028388 | 3/2011 |

OTHER PUBLICATIONS

Fried, "FireWire poised to become ubiquitous," downloaded Oct. 16, 2001, CNET News.com, 1394 Trade Association: Press, wysiwyg:/132/http:/ 11394ta.org/Press/200 1Press/august!8.2 7. b.html.

Fried, "New Fire Wire to blaze faster trail," downloaded Oct. 16, 2001, CNET News.com, http://news.cnet.com/news/0/I006-200-6021210.html.

"IEEE 1394/USB Comparison," downloaded Oct. 16, 2001, www.genitech.com.aulLIBRARY/TechSupportiinfobits/firewirevsusb.html.

"PMC FW2 IEEE 1394 FireWire Controller", downloaded Oct. 16, 2001, http://www.bymltd.co.uk/PMCfw2ds.html.

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

"Universal Serial Bus Specification—Rev 2.0," Chapter 6: Compaq Hewlett-Packard, Apr. 27, 2000, pp. 85, 99-100.

"Universal Serial Bus Specification—Rev 2.0," XP002474828, Chapter 9: USB Device Framework, pp. 239-274.

"On-The-Go Supplement to the USB 2.0 Specification—Rev 1.3" Dec. 5, 2006, 53 pages.

"On-The-Go and Embedded Host Supplement to the USB Revision 2.0 Specification—Rev 2.0" May 8, 2009, 79 pages.

International Search Report mailed on Jan. 12, 2011 for PCT Patent Application No. PCT/US2010/045373 A1, 6 pages.

Combined Search Report and Examination under Sections 17 and 18(3) for GB Patent Application No. GB1014178.6, mailed on Dec. 16, 2010, 8 pages.

Combined Search and Examination Report mailed on Feb. 16, 2012 for GB Patent Application No. GB1118925.5, 6 pages.

Combined Search and Examination Report mailed on Feb. 16, 2012 for GB Patent Application No. GB1118926.3, 5 pages.

International Preliminary Report on Patentability mailed on Mar. 15, 2012 for PCT Patent Application No. PCT/US2010/045373, 10 pages.

Examination Report mailed on Feb. 16, 2012 for GB Patent Application No. GB1014178.6, 2 pages.

Examination Report mailed on Jul. 12, 2012 for GB Patent Application No. GB1014178.6, 2 pages.

Examination Report mailed Feb. 2, 2015 in European Patent Application No. 10748170.7, 5 pages.

Extended Examination Report mailed Feb. 27, 2015 in European Patent Application No. 14194814.1, 7 pages.

Office Action (English Translation) mailed Dec. 9, 2014 in Chinese Patent Application No. 201080038868.0, 3 pages.

* cited by examiner

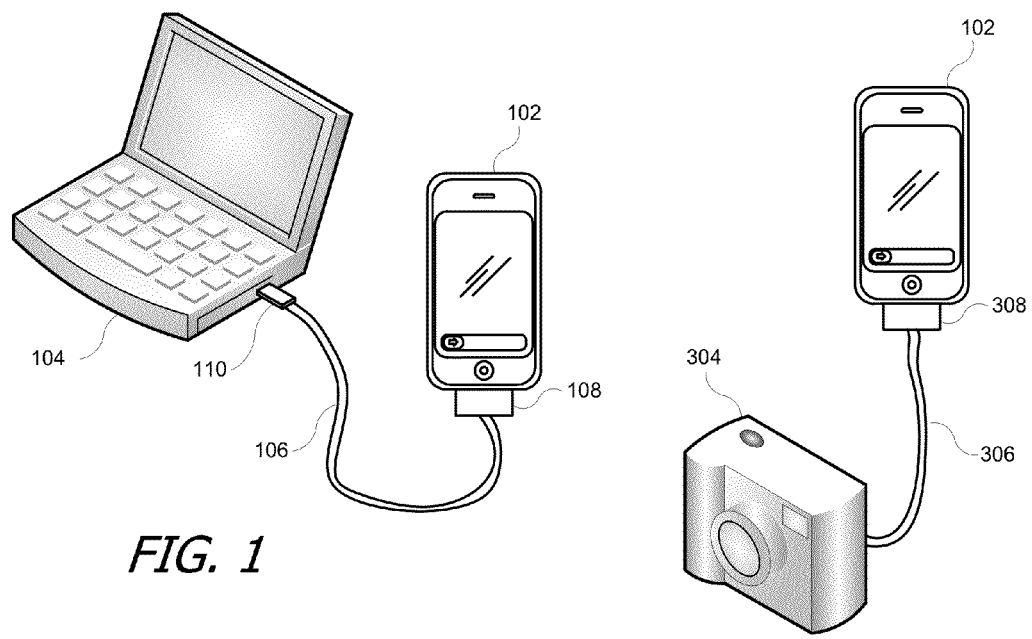
FIG. 1
FIG. 3
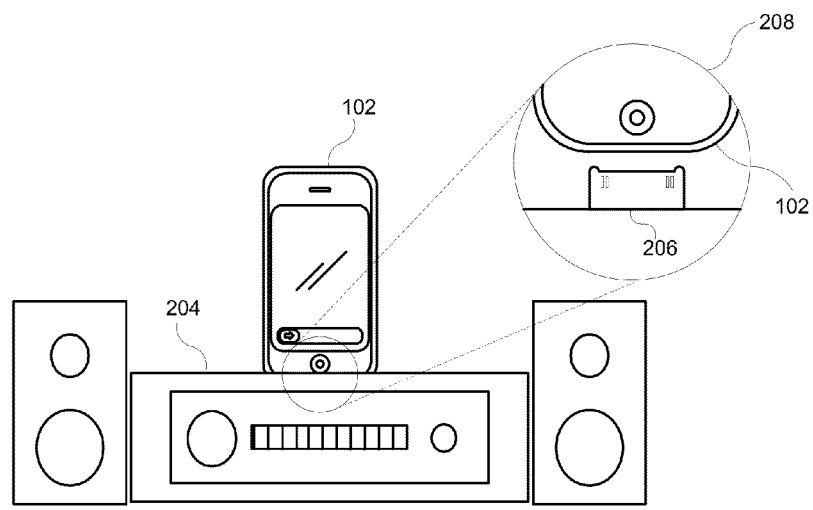
FIG. 2

DEVICE DEPENDENT SELECTION BETWEEN MODES FOR ASYMMETRIC SERIAL PROTOCOLS

CROSS-REFERENCE TO RELATED APPLICATION

This application is a divisional application of, and claims priority to, U.S. patent application Ser. No. 12/551,824, filed Sep. 1, 2009, the contents of which are hereby incorporated by reference in its entirety.

BACKGROUND

The present disclosure relates generally to portable communication devices that communicate with accessory devices using serial protocols and in particular to device-dependent selection by the portable communication device between modes (or roles) of an asymmetric serial protocol.

In recent years, a number of portable communication devices (PCDs) have been developed. Examples of PCDs include, for example, portable media players, mobile phones, personal digital assistants (PDAs), portable e-mail devices, video game players, portable navigation units relying on Global Positioning System (GPS) satellite data, and multi-function devices that can integrate numerous functions such as media storage and playback, mobile phone, Internet access, e-mail, personal information management, game play, GPS/navigation capability, and the like. Examples of multi-function PCDs include various iPhone® and iPod® models manufactured and sold by Apple Inc., assignee of the present application, as well as other portable electronic devices made and sold by other manufacturers and distributors under their respective brand names.

PCDs are frequently docked with other electronic devices, referred to herein as "accessories." For example, from time to time, a user may dock a PCD with a personal computer to synchronize media content and/or metadata, personal data, and the like. A user may at other times dock the same PCD with other electronic devices, such as an in-vehicle media system, a speaker dock, or the like. The user may also dock the PCD with a charger that provides power to the PCD but does not include other data or information sharing capability.

To facilitate communication between PCDs and accessories, it is common to rely on standard point-to-point communication protocols, such as Universal Serial Bus (USB). The USB specification (promulgated by USB Implementers Forum, Inc. and available at their website, www.usb.org) specifies two signal contacts, referred to as D+ and D−, for data transmission and two additional contacts for power, referred to as $V_{BUS}$ and specified as 5.0 volts (V), and ground. In a USB connection, a "USB host" delivers power to the $V_{BUS}$ contact while a "USB device" relies on the USB host to provide the $V_{BUS}$ power.

BRIEF SUMMARY

USB is an asymmetric communication protocol, in the sense that the USB host and USB device use the connection contacts differently. This can create problems when connecting a PCD to different accessories at different times, as some accessories may prefer the PCD to act as USB host while other accessories prefer the PCD to act as a USB device. For example, when some PCDs connect to a computer via USB, the computer acts as USB host and provides power that can be used to charge the PCD. However, if a PCD connects to another portable electronic apparatus, such as a digital camera, the other apparatus may expect that it will be able to act as the USB device, in which case the PCD would need to act as a USB host. If the PCD cannot switch to a USB host mode, its ability to connect to different accessories may be limited.

Certain embodiments of the present invention provide PCDs that can automatically switch into one or another mode of an asymmetric communication protocol depending on the type of accessory connected. In some embodiments, the accessory (which can be any electronic apparatus that connects to a PCD) can signal its preference for whether the PCD should operate in a first mode or a second mode of the asymmetric protocol. Such signaling can be achieved, e.g., using a hardware mechanism such as an identification resistor or a software mechanism such as a command protocol. The PCD can detect this preference and configure itself in the operating mode identified by the accessory. Thus, for example, if the asymmetric communication protocol is a USB protocol, the accessory can indicate whether the PCD should operate as a USB host or a USB device.

In some embodiments, the PCD can conform precisely to a standard protocol such as USB when operating in one mode (e.g., USB device mode) but deviate from that protocol when operating in another mode (e.g., USB host mode). For example, in accordance with standard USB protocols, the USB host supplies 5.0 V of power on a $V_{BUS}$ line to the USB device. A PCD can receive 5.0 V of power when operating as a USB device but supply a lower voltage (e.g., 3.3 V) when operating as a USB host. This can reduce power consumption by the PCD.

The following detailed description together with the accompanying drawings will provide a better understanding of the nature and advantages of the present invention.

BRIEF DESCRIPTION OF THE DRAWINGS

FIG. 1 illustrates a PCD docked with a computer according to an embodiment of the present invention.

FIG. 2 illustrates a PCD docked with a sound system according to an embodiment of the present invention.

FIG. 3 illustrates a PCD docked with a digital camera according to an embodiment of the present invention.

DETAILED DESCRIPTION

Figure 4:
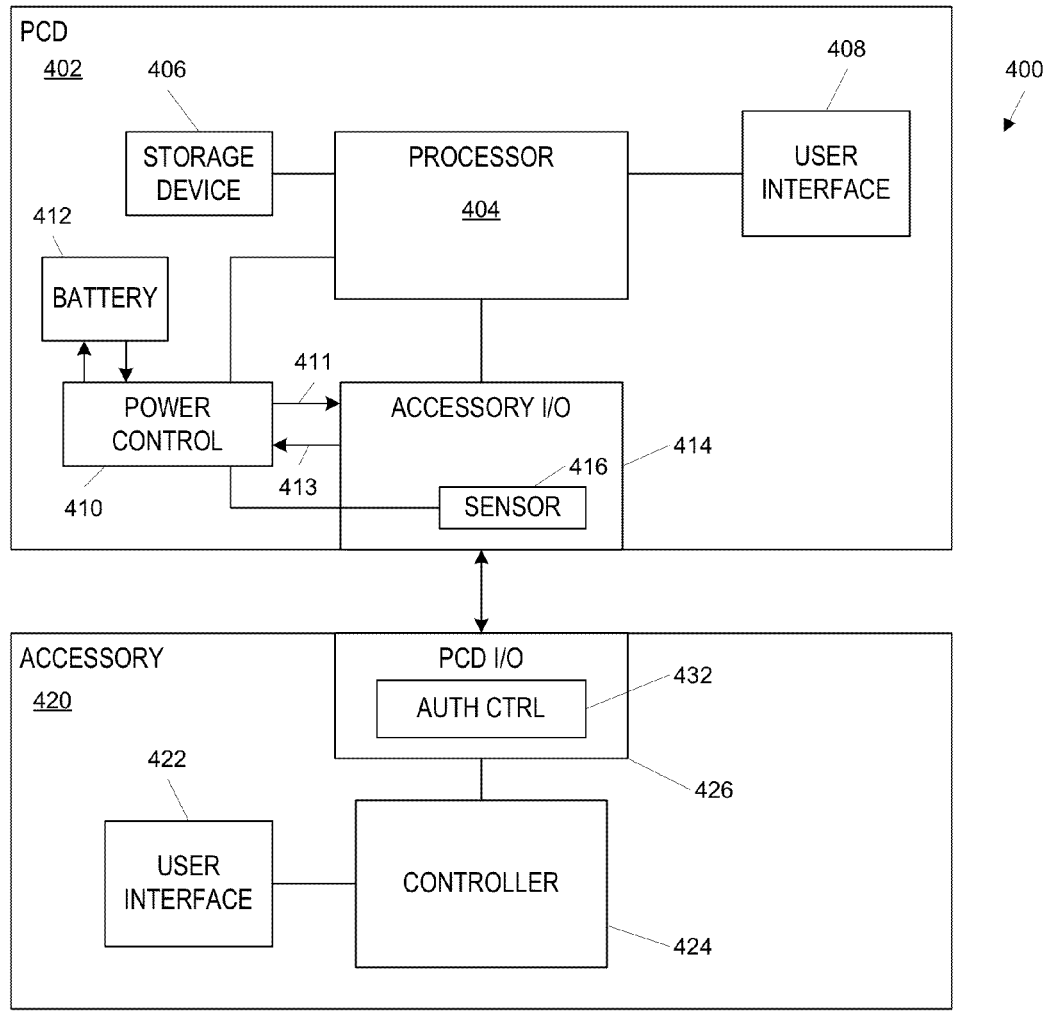
FIG. 4 is a block diagram of a system according to an embodiment of the present invention.

Certain embodiments of the present invention provide PCDs that can automatically switch into one or another mode of an asymmetric communication protocol depending on the type of accessory connected. In some embodiments, the accessory (which can be any electronic apparatus that connects to a PCD) can signal its preference for whether the PCD should operate in a first mode or a second mode of the asymmetric protocol. Such signaling can be achieved, e.g., using a hardware mechanism such as an identification resistor or a software mechanism such as a command protocol. The PCD can detect this preference and configure itself in the operating mode identified by the accessory. Thus, for example, if the asymmetric communication protocol is a USB protocol, the accessory can indicate whether the PCD should operate as a USB host or a USB device.

FIG. 1-3 illustrate a PCD docked (or connected) to accessories according to embodiments of the present invention. In FIG. 1, PCD 102 is docked with computer 104 via cable 106. Cable 106 in this embodiment can include wires to carry the standard USB signals (D+, D−, VBUS, and ground) and can also include other wires. In one embodiment, connector 108 connects cable 106 to a mating receptacle (not explicitly shown) on a bottom surface of PCD 102. The mating receptacle of PCD 102 may include a larger number of pins than is required for USB communication (e.g., 30 pins in one embodiment), as described below with reference to FIG. 4. The additional pins can increase the range of accessories with which PCD 102 can be docked and the types of information that PCD 102 can exchange with an accessory when docked. In one embodiment, connector 110 connects cable 106 to a mating receptacle (not explicitly shown) on a side surface of computer 104. Connector 110 can be, for example, a standard USB connector, and the mating receptacle can be a standard USB receptacle. In the configuration of FIG. 1, computer 104 can act as a USB host while PCD 102 acts as a USB device.

In FIG. 2, PCD 102 is docked with sound system 204. Docking can be accomplished by providing docking connector 206 (shown in inset 208) on a top surface of sound system 204 and inserting docking connector 206 into the mating receptacle (not explicitly shown) of PCD 102. In this configuration, docking connector 206 may include mating pins corresponding to some or all of the pins in the mating receptacle of PCD 102. Depending on the implementation of sound system 204, it may be desirable for PCD 102 to present a USB host configuration or a USB device configuration.

In FIG. 3, PCD 102 is docked with digital camera 304 via cable 306. In some embodiments, cable 306 can be similar to cable 106 of FIG. 1. Connector 308 connects cable 306 to a mating receptacle (not explicitly shown) of PCD 102. Digital camera 304 can provide a USB receptacle or a receptacle with additional pins to receive a connector (not shown) at one end of cable 306. In some embodiments, digital camera 304 can only operate as a USB device, in which case it is desirable for PCD 102 to present a USB host configuration.

It will be appreciated that the PCD/accessory connections described herein are illustrative and that variations and modifications are possible. A PCD can connect to a wide range of other electronic apparatus, and the term "accessory" as used herein refers generally to any electronic apparatus with which a PCD can be connected. A PCD can operate in either a USB host or USB device mode when connected to a USB-compliant accessory. As described below, the operating mode that a PCD presents to an accessory can be controlled using accessory identification pins provided on the mating receptacle of PCD 102 and corresponding pins on cable connector 106 or docking connector 206.

FIG. 4 is a block diagram of a system 400 according to an embodiment of the present invention. System 400 can include PCD 402 (e.g., implementing PCD 102 of FIGS. 1-3) and an accessory 420 (e.g., implementing any one of accessories 104, 204, 304 of FIGS. 1-3).

PCD 402 in this embodiment can provide communication and/or media playback capability. PCD 402 can include processor 404, storage device 406, user interface 408, power control module 410, battery 412, and accessory input/output (I/O) interface 414. PCD 402 can also include other components (not explicitly shown) to provide various enhanced capabilities. For example, in some embodiments PCD 402 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), a GPS receiver, and/or other components.

Storage device 406 can be implemented, e.g., using disk, flash memory, or any other non-volatile storage medium. In some embodiments, storage device 406 can store media assets such as audio, video, still images, or the like, that can be played by PCD 402. Storage device 406 can also store other information such as a user's contacts (names, addresses, phone numbers, etc.); scheduled appointments and events; notes; and/or other personal information. In some embodiments, storage device 406 can store one or more application programs to be executed by processor 404 (e.g., video game programs, personal information management programs, etc.).

User interface 408 may include input devices such as a touch pad, touch screen, scroll wheel, click wheel, dial, button, switch, keypad, microphone, or the like, as well as output devices such as video screen, indicator lights, speakers, headphone jacks, or the like, together with supporting electronics (e.g., digital-to-analog or analog-to-digital converters, signal processors, or the like). A user can operate input devices of user interface 408 to invoke the functionality of PCD 402 and can view and/or hear output from PCD 402 via output devices of user interface 408.

Processor 404, which can be implemented as one or more integrated circuits (e.g., a conventional microprocessor or microcontroller), can control the operation of PCD 402. In various embodiments, processor 404 can execute a variety of programs in response to program code and can maintain multiple concurrently executing programs or processes. At any given time, some or all of the program code to be executed can be resident in processor 404 and/or in storage media such as storage device 406.

Through suitable programming, processor 404 can provide various functionality for PCD 402. For example, in response to user input signals provided by user interface 408, processor 404 can operate a database engine to navigate a database of media assets stored in storage device 406 in response to user input and display lists of selected assets. Processor 404 can respond to user selection of an asset (or assets) to be played by transferring asset information to a playback engine also operated by processor 404, thus allowing media content to be played. Processor 404 can also operate other programs to control other functions of PCD 402.

Power control module 410 provides power management capability for PCD 402. For example, power control module 410 can deliver power from battery 412 to accessory I/O interface 414 via line 411 and to other components of PCD 402 (connections not shown). Power control module 410 can also receive power via accessory I/O interface 414 and line 413 and deliver received power to various components of PCD 402 (connections not shown); received power can also be delivered to battery 412, thereby allowing battery 412 to be recharged via accessory I/O interface 414. In some embodiments, power control module 410 can be implemented using programmable or controllable circuits operating in response to control signals generated by program code executing on processor 404 or as a separate microprocessor or microcontroller.

In some embodiments, power control module 410 is responsive to signals from sensor 416 in accessory I/O interface 414. As described below, sensor 416 can generate a signal indicative of the type of accessory connected, and power control module 410 can use this information to determine, e.g., whether to distribute power from battery 412 or received power from the accessory. Power control module 410 can also provide other power management capabilities, such as regulating power consumption of other components of PCD 402 based on the source and amount of available power, monitoring stored power in battery 412 and generating user alerts if the stored power drops below a minimum level, and so on.

Accessory I/O interface 414 can allow PCD 402 to communicate with various accessories. For example, accessory I/O interface 414 might support connections to a computer (e.g., as shown in FIG. 1), an external speaker dock (e.g., as shown in FIG. 2), a digital camera (e.g., as shown in FIG. 3), a radio tuner (e.g., FM, AM and/or satellite), an in-vehicle entertainment system, an external video device, or the like. In accordance with some embodiments of the invention, accessory I/O interface 414 can determine whether to operate in USB host or USB device mode when connected to an accessory. As described below, sensor 416 can be used to detect identifying information from a connected accessory, and this identifying information can be used to select an operating mode.

In some embodiments, accessory I/O interface 414 can include a connector, such as a 30-pin connector corresponding to the connector used on iPod® and iPhone® products, as well as supporting circuitry. The connector can provide connections for power and ground as well as for various wired communication interfaces such as USB, FireWire, and/or universal asynchronous receiver/transmitter (UART). Thus, accessory I/O interface 414 can support multiple communication channels, and a given accessory can use any or all of these channels.

Accessory 420 includes controller 424, user interface 422, and PCD I/O interface 426. Accessory 420 is representative of a broad range of electronic apparatus to which PCD 402 can be connected, and it is understood that accessories can vary widely in capability, complexity and form factor. Various accessories may include components not shown in FIG. 4, including but not limited to storage devices (disk, memory, etc.); video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Controller 424 can include, e.g., a microprocessor or microcontroller executing program code to perform various functions associated with accessory 420. For example, where accessory 420 is a personal computer system (e.g., as shown in FIG. 1), the program code can include an operating system, a driver program associated with a USB port, and a content management program that allows a user to control what content is stored on PCD 402 by interacting with user interface 422 of accessory 420. In the case of a personal computer, program code executed by controller 424 can also include various application programs completely unrelated to PCD 402. In some embodiments where accessory 420 is a sound system (e.g., as shown in FIG. 2), program code executed by controller 424 can include programs for digital audio decoding, analog or digital audio processing, and the like. In some embodiments where accessory 420 is a digital camera (e.g., as shown in FIG. 3), program code executed by controller 424 can include programs that allow a user to control the camera to capture images, display images, transfer image data to another electronic apparatus, etc.

User interface 422 may include input controls such as a touch pad, touch screen, scroll wheel, click wheel, dial, button, switch, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 422 to invoke the functionality of accessory 420 and can view and/or hear output from accessory 420 via user interface 422.

PCD I/O interface 426 can allow accessory 420 to communicate with PCD 402 (or another PCD). In accordance with some embodiments of the invention, PCD I/O interface 426 can incorporate a USB interface. For example, PCD I/O interface 426 can provide a standard, mini, or micro USB port. In other embodiments, PCD I/O interface 426 can include a connector that mates directly with a connector included in PCD 402, such as a 30-pin connector that mates with the connector used on various iPod® products. Such a connector can be used to supply power to PCD 202 or receive power from PCD 202, to receive audio and/or video signals in analog and/or digital formats, and to communicate information via various interfaces such as USB, UART, and/or FireWire.

Accessory 420 can be any electronic apparatus that interacts with PCD 402, including but not limited to any of the examples shown in FIGS. 1-3. In some embodiments, accessory 420 can provide remote control over operations of PCD 402, or a remote user interface that can include both input and output controls (e.g., a display screen). Accessory 420 in various embodiments can control any function of PCD 402 and can also receive media content from PCD 402 and present such content to the user (e.g., through audio speakers and/or video display screen, depending on the type of media content). In other embodiments, PCD 402 can control operations of accessory 420, such as retrieving image data from a digital camera incorporated into accessory 420, initiating an image capture operation, etc.

It will be appreciated that the system configurations and components described herein are illustrative and that variations and modifications are possible. The PCD and/or accessory may have other capabilities not specifically described herein (e.g., mobile phone, global positioning system (GPS), broadband data communication, Internet connectivity, etc.).

Further, while the PCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 414 of PCD 402 and PCD I/O interface 426 of accessory 420 allow PCD 402 to be connected with accessory 420 and subsequently disconnected from accessory 420. As used herein, PCD 402 and accessory 420 are "connected" whenever a communication channel is open between PCD I/O interface 426 and accessory I/O interface 414. Such connection can be achieved via direct physical connection, e.g., with mating connectors; indirect physical connection, e.g., via a cable; and/or wireless connection, e.g., via Bluetooth. PCD 402 and accessory 420 are said to be "docked" whenever an electrical connection is established between pins of PCD I/O interface 426 and corresponding pins of accessory I/O interface 414. Docking can be achieved directly, e.g., with mating connectors, or indirectly, e.g., via a cable. In the case of an indirect connection, the connectors for accessory 420 and PCD 402 need not have corresponding form factors or numbers or arrangements of pins.

In some embodiments, PCD 402 and accessory 420 can communicate while connected (e.g., docked) by exchanging commands and data according to a PCD-specific protocol. The commands and data can be communicated, e.g., using USB Human Interface Device (HID) as a transport or using another transport provided by accessory I/O interface 414 and PCD I/O interface 426. The PCD-specific protocol defines a format for messages to be exchanged between PCD 202 and accessory 220. For instance, the PCD-specific protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The accessory protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all PCDs to which an accessory can be connected, support every lingo defined within the accessory protocol.

In some embodiments, every accessory 420 and every PCD 402 that use the PCD-specific protocol support at least a "general" lingo that includes commands common to the PCD and all accessories. The general lingo can include commands enabling the PCD and the accessory to identify and authenticate themselves to each other and to provide general information about their respective capabilities, including which (if any) other lingoes each supports. The general lingo can also include authentication commands that the PCD can use to verify the purported identity and capabilities of the accessory (or vice versa), and the accessory (or PCD) may be blocked from invoking certain (or all) commands or lingoes if the authentication is unsuccessful. In addition, in some embodiments the PCD can block the accessory from using USB functionality of the PCD if authentication is unsuccessful.

A PCD-specific protocol can also include various other lingoes, such as a simple remote lingo that allows accessory 420 to send a command indicating a function of PCD 402 to be invoked, a remote user interface lingo that can be used to communicate commands and data related to replicating all or part of a user interface of PCD 402 on accessory 420 (thereby supporting a more advanced remote control), a tuner lingo that allows a user to control a tuner accessory 420 by operating PCD 402, a storage lingo that allows accessory 420 to store data on PCD 402, and so on. Any lingo or combination of lingoes or other commands or groups of commands can be used in connection with a PCD-specific protocol.

In some embodiment, the PCD-specific protocol can provide a software-based mechanism that allows an accessory to communicate a desired configuration for an asymmetric protocol to the PCD. For example, in the case where the asymmetric protocol is USB, the commands can include a GetUSBMode command, a ReturnUSBMode command and a SetUSBMode command. The GetUSBMode command can be sent by the accessory to the PCD to request the current USB operating mode of the PCD. The PCD can respond with the ReturnUSBMode command, whose payload can include a parameter indicating the current USB mode (for example, USB host, USB device, or unconfigured). A SetUSBMode command can be sent by the accessory to change the USB mode; the payload of this command can include a parameter indicating the desired USB mode. Other commands can also be provided, and such commands can be part of a general lingo or a special-purpose lingo as desired.

In one embodiment using software mechanisms to control a USB configuration, the PCD and accessory can first connect using a transport (e.g., UART or a wireless transport) other than USB. The accessory can then send commands of the PCD-specific protocol to determine the current USB mode of the PCD and/or to request that the PCD switch to the desired mode.

Figure 5:
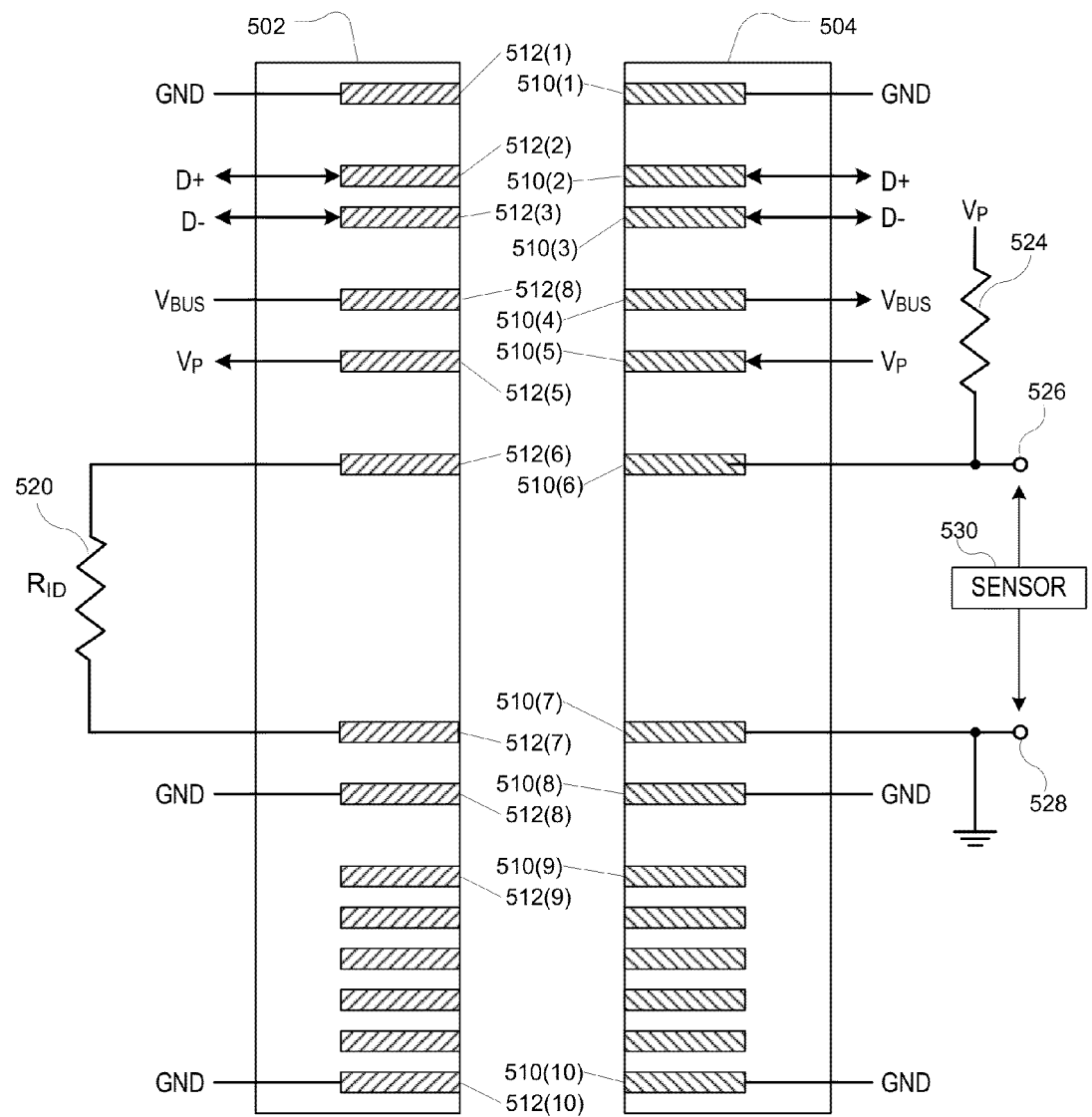
FIG. 5 is a simplified connection diagram illustrating connections that can be provided between an accessory and a PCD according to an embodiment of the present invention.

In other embodiments, hardware mechanisms can be used to control configuration of the asymmetric protocol. By way of illustration, FIG. 5 is a simplified connection diagram illustrating connections that can be provided between an accessory and a PCD according to an embodiment of the present invention. An accessory-side connector 502 is represented on the left and a PCD-side connector 504 on the right. In some embodiments, accessory-side connector 502 can be part of PCD I/O interface 426 of accessory 402 of FIG. 4, and PCD-side connector 504 can be part of accessory I/O interface 414 of PCD 402 of FIG. 4. In other embodiments, features of accessory-side connector 502 can be incorporated, e.g., into connector 108 of FIG. 1, with only pins relevant to operation of the accessory being connected to wires of cable 106.

In this example, PCD-side connector 504 provides a number of pins 510. (Herein, multiple instances of like objects are denoted with reference numbers identifying the object and parenthetical numbers identifying the instance where needed.) These pins include a number of ground (GND) pins 510(1), 510(2), 510(8) and 510(10); USB D+ pin 510(2) and D− pin 510(3) for exchanging USB signals with the accessory; $V_{BUS}$ pin 510(4) that can receive power (e.g., at 5.0 V) from an accessory; $V_P$ pin 510(5) that can provide power (e.g., at 3.3 V) to an accessory; and accessory identification pins 510(6) and 510(7). Other pins, e.g., pin 510(9) can provide signals not relevant to the present description, such as UART signals, FireWire signals, audio and/or video output signals to the accessory in digital and/or analog formats, audio input signals from the accessory, and so on. In one embodiment, PCD-side connector 504 can have a total of 30 pins; the number and arrangement of pins can be varied as desired. In some embodiments, ground pins 510(1), 510(2), 510(8) and 510(10) can be made longer than all other pins 510 so that the ground connections are first to be made and last to be broken as PCD-side connector 504 engages with and disengages from accessory-side connector 502. Such a configuration can reduce the risk of electrical damage to a PCD during docking and undocking.

Similarly, accessory-side connector 502 provides a number of pins 512. These pins include ground pins 512(1), 512(2), 512(8) and 512(10); USB D+ pin 512(2) and D− pin 512(3) for exchanging USB signals with the accessory; $V_{BUS}$ pin 512(4) that can provide power (e.g., at 5.0V) to a PCD; $V_P$ pin 512(5) that can receive power (e.g., at 3.3 V) from a PCD; and accessory identification pins 512(6) and 512(7). Other pins, e.g., pin 512(9) can provide signals not relevant to the present description, such as UART signals, FireWire signals, audio and/or video input signals from the PCD in digital and/or analog formats, audio output signals to the PCD, and so on. In one embodiment, accessory-side connector 502 can have a total of 30 pins; the number and arrangement of pins can be varied as desired.

As shown, PCD-side connector 504 and accessory-side connector 502 provide the electrical connections required for a standard USB connection (bidirectional D+ and D− signals, $V_{BUS}$, and ground), although not necessarily in a form factor compliant with USB standards. Accessories that provide a USB port with a standard form factor can be connected to PCD-side connector 504 using a cable (not shown in FIG. 5) that passes through the USB signals from accessory-side connector 502 to a standard USB connector (not shown). Any pins of accessory-side connector 502 that are not actually connected to the accessory can be left floating or terminated to prevent line noise as appropriate, or unused signal contacts may simply be omitted.

FIG. 5 illustrates a technique that can be used in one embodiment to identify whether the PCD should operate in a USB host or USB device mode when connected to an accessory by using signals generated on accessory identification pins 510(6) and 510(7). Specifically, accessory-side connector 502 includes identification resistor 520 connected between pins 512(6) and 512(7). On PCD-side connector 504, pin 510(6) is connected via a pull-up resistor 524 to a reference voltage (e.g., $V_P$, although a different voltage can also be used). Pin 510(7) is connected to ground.

In operation, when accessory-side connector 502 is connected to PCD-side connector 504, electrical contact is achieved between pins 512(6) and 510(6) and between pins 512(7) and 510(7). A voltage difference develops between nodes 526 and 528, and this difference is detected by sensor 530 (e.g., implementing sensor 416 of FIG. 4). Since pull-up resistor 524 is fixed, the voltage difference corresponds to the resistance ($R_{ID}$) of identification resistor 520. Thus, sensor 530 can detect the resistance $R_{ID}$. In some embodiments, sensor 530 can output an analog or digital signal indicative of the resistance. In the embodiment of FIG. 4, this signal can be delivered to power control module 410; the sensor signal can also be delivered to processor 404 and/or other components of PCD 402.

In one embodiment, different resistance values $R_{ID}$ are associated with different USB operating modes of the PCD. For instance, a first resistance value can indicate that the PCD should operate in a USB host mode while a second resistance value can indicate that the PCD should operate in a USB device mode. Certain embodiments may also use other resistance values to provide other information. For example, the USB standard defines various configurations that a USB device can present to a USB host, such as "human interface device" (HID) configuration or "mass storage device" configuration. Different resistance values $R_{ID}$ can be associated with each of these USB device configurations. Accordingly, the same PCD can present a USB host mode to a first accessory, a USB device mode in an HID configuration to a second accessory, and a USB device mode in a mass storage configuration to a third accessory, depending on the resistance $R_{ID}$ detected between pins 510(6) and 510(7) by sensor 530.

In some embodiments, some accessories can have connectors 502 that do not provide an identification resistor 520. For example, pins 512(6) and 512(7) can be shorted together, or they can be disconnected from each other. In such embodiments, the absence of resistor 520 can be detected by sensor 530 and interpreted as a request for the PCD's "default" mode of operation. In one embodiment, the PCD operates in a mass-storage USB device mode by default and only switches to USB host mode if the specific resistance $R_{ID}$ associated with PCD-as-USB host configuration is detected.

It will be appreciated that the connector configuration described herein is illustrative and that variations and modifications are possible. Different numbers and/or arrangements of pins can be substituted. The connector form factors may also vary. In the embodiment shown in FIG. 5, the PCD provides power on one pin when it is the USB host but receives power on a different pin when it is the USB device. Different accessories can thus connect to one power pin or the other, depending on whether the accessory is the USB device or the USB host, and do not need to (but may) connect to both. In other embodiments, the same pin can be operated bidirectionally, with the PCD either receiving or supplying a voltage on that pin depending on whether it is the USB host or the USB device. Further, although in some embodiments, the power level is different between PCD-as-USB host and PCD-as-USB device modes, this is also not required. If the PCD as USB host does provide different power, any accessories operating as USB devices can be configured to accept the power as provided. For example, an accessory may have a battery or connect to an external power source if it requires more power than the PCD provides. Further, the PCD may use signal levels on the USB D+/D− lines that are limited to a maximum voltage level equal to the $V_P$ line, and accessories can be configured to detect these voltage levels.

In some embodiments, the accessory can simply provide a standard USB interface with a USB connection port having any standard form factor. The accessory may be fixedly configured to operate as either a USB host or a USB device. For purposes of connecting the accessory to a PCD implementing the identification scheme of FIG. 5, a cable such as cable 106 of FIG. 1 or cable 306 of FIG. 3 can be configured with the appropriate resistor disposed within the PCD connector (e.g., connector 108 of FIG. 1 or connector 308 of FIG. 3). If the accessory operates as a USB host, the $V_{BUS}$ pin of connector 502 can be connected to the USB $V_{BUS}$ pin. If the accessory operates as a USB device, the $V_P$ pin of connector 502 can be connected to the USB $V_{BUS}$ pin.

In some embodiments, an accessory can select or change its identification resistance $R_{ID}$ to request different USB modes at different times. For example, an accessory with which a PCD can dock may provide both a user input device (e.g., keyboard, mouse) or other apparatus that presents as a USB device and a pass-through to a personal computer or other apparatus that presents as a USB host. Except when the PCD is actually in communication with the USB host, it can be instructed by the accessory to operate in USB host mode. In some embodiments, the accessory can dynamically switch the resistance $R_{ID}$ during operation. The PCD can monitor the identification pins, detect a change in $R_{ID}$, and switch its USB mode accordingly.

Further, some accessories may be equipped with a standard USB On-the-Go receptacle that includes an ID pin in addition to the four standard USB pins; the ID pin indicates to the USB On-the-Go accessory whether it should operate as a USB host or USB device. For coupling a PCD to such an accessory, a special role-selecting adapter can be provided (e.g., as a cable or unitary connector). One end of the adapter can include a connector that mates with the PCD and supplies a resistance $R_{ID}$ across the appropriate pins to indicate which USB mode the PCD should operate in. The other end of the adapter can include a connector that mates with the USB On-the-Go receptacle of the accessory and ties the ID pin to indicate that the accessory should operate in the other USB mode. Thus, for example, if $R_{ID}$ at one end of the adapter indicates that the PCD should operate as USB host, the USB On-the-Go ID pin at the other end would indicate that the accessory should operate as USB device.

Figure 6:
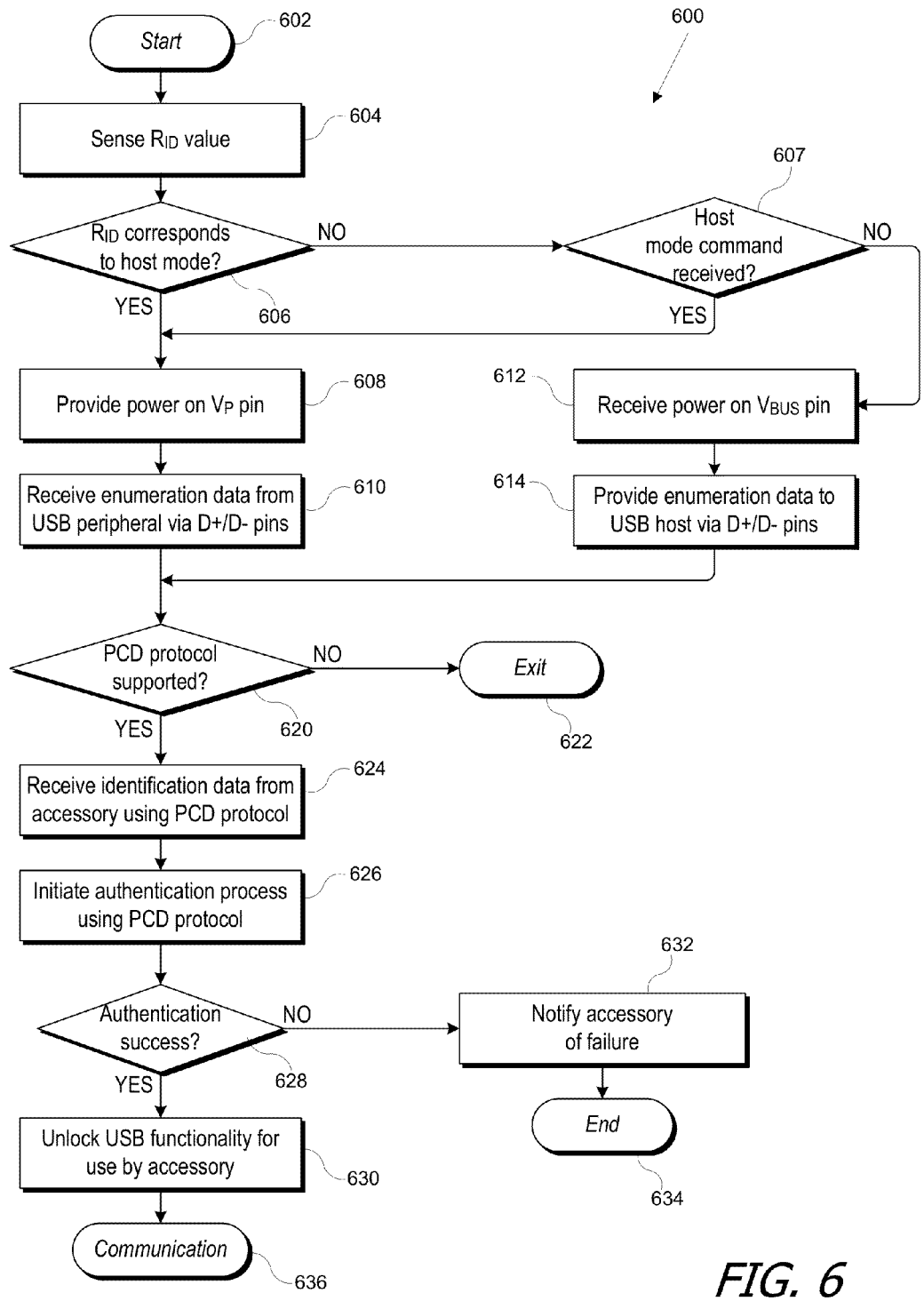
FIG. 6 is a flow diagram of a process for establishing a connection to an accessory according to an embodiment of the present invention.

FIG. 6 is a flow diagram of a process 600 for establishing a connection to an accessory according to an embodiment of the present invention. Process 600 can be implemented, e.g., in program code executing on processor 404 of PCD 402 (FIG. 4), in dedicated control logic within accessory I/O interface 414, or in any combination thereof.

Process 600 starts (block 602) when accessory I/O 414 interface detects that contact has been established between its connector pins (e.g., pins 510 of connector 504 in FIG. 5) and corresponding pins of an accessory connector (e.g., pins 512 of connector 502). At block 604, sensor 530 can sense the resistance $R_{ID}$ across accessory identification pins 510(6) and 510(7).

At block 606, it is determined whether the sensed resistance $R_{ID}$ corresponds to the resistance associated with a request for the USB host mode of the PCD. If so, then the PCD enters the USB host mode. If not, then at block 607, it is determined whether a host mode command (e.g., a SetUSB-Mode command requesting USB host mode) has been received from the accessory. If the USB connection is not currently configured such that the accessory can use it to send PCD-specific protocol commands, another transport that has been configured (e.g., UART or a wireless transport) can be used for the command. If a host mode command is received at block 607, the PCD can enter the USB host mode even if no resistance $R_{ID}$ or a resistance $R_{ID}$ not associated with host mode was sensed at block 606.

Thus, the PCD can enter USB host mode either in response to sensing the appropriate resistance $R_{ID}$ at block 606 or receiving a command requesting host mode at block 607. Entering host mode can include various actions. For example, at block 608, the PCD can provide power to the accessory, e.g., via $V_P$ pin 510(5). The power provided to the accessory can be the same as or different from standard USB power levels, as described above. At block 610, the PCD can receive enumeration data from the accessory (which is operating in USB device mode) via D+/D− pins 510(2), 510(3). Enumeration can be implemented according to USB standards, with the accessory providing various identifiers such as a vendor identifier and a model identifier. In some embodiments, the enumeration data can also include data specific to interaction with the PCD, such as whether the accessory supports communication using a PCD-specific protocol via the USB connection.

On the other hand, if block 606 results in a determination that the sensed resistance $R_{ID}$ does not correspond to the resistance associated with a request for the USB host mode of the PCD and block 607 results in a determination that no command requesting USB host mode has been received, then the PCD can enter a USB device mode. For example, at block 612, the PCD can receive USB power (e.g., 5 V) from the accessory, e.g., via $V_{BUS}$ pin 510(4). At block 614, the PCD can provide enumeration data to the accessory (which is acting as a USB host) via D+/D− pins 510(2), 510(3). Similarly to the case where the PCD is acting as USB host, enumeration can be implemented according to USB standards, in this case with the PCD providing various identifiers such as a vendor identifier and a model identifier.

After enumeration completes, the PCD and accessory can begin to exchange signals via the USB D+ and D− pins, regardless of which of the two is the USB host. Thus, for example, the PCD can provide USB digital audio to the accessory, or the accessory can transfer various data files to or from the PCD, or the like.

In some embodiments, the PCD can control the availability of USB functionality after enumeration. For example, at block 620, regardless of whether the PCD or accessory acts as USB host, the PCD can determine whether the accessory supports communication using a PCD-specific protocol via the USB port or in some instances another port. If the PCD-specific protocol is not supported, then process 600 can exit (block 622). In some embodiments, the PCD can permit the accessory to use at least some USB functionality even if the PCD-specific protocol is not supported; in other embodiments, the PCD locks out further USB communication with any accessory that does not support the PCD-specific protocol.

If the PCD-specific protocol is supported, then at block 624, the PCD can receive identification data from the accessory. This data can include, e.g., a list of which lingoes of the PCD-specific protocol are supported by the accessory, information as to the accessory's preferences for initial configuration (such as whether various inputs and/or outputs should be enabled or disabled), and so on. In some embodiments, the identification data can be sent by the accessory using one or more commands of a general lingo of a PCD-specific protocol via the USB transport link that has been established.

At block 626, the PCD can initiate an authentication process with the accessory. In some embodiments, the authentication operation can include verifying a digital certificate provided by the accessory and testing a cryptological digital signature provided by the accessory against a public key associated with the digital certificate. In some embodiments, authentication operations may be facilitated using an authentication controller that can be embedded into PCD I/O interface 432 of accessory 420 as shown in FIG. 4. In other embodiments, an authentication controller may be embedded in a cable connecting the accessory to the PCD, and authentication for the USB connection can be provided by a controller that communicates using pins other than the USB pins.

At block 628, it is determined whether the authentication process succeeded. If so, then at block 630, the PCD can unlock USB functionality for use by the accessory. For example, in some embodiments, the PCD can permit the accessory to enumerate and send certain commands of the PCD-specific protocol via the USB port without first having successfully authenticated. Following block 630, communication can continue (block 636) until the connection is terminated. In some embodiments, an established USB connection can be used at block 636 to exchange commands of the PCD-specific protocol with USB as the transport.

In some embodiments, communication at block 636 can include changing the mode of the USB connection. In some embodiments, after initially establishing a configuration for the USB connection, the accessory can change the established configuration, e.g., by changing $R_{ID}$ or by sending a SetUSB-Mode command. Depending on implementation, sending of a SetUSBMode command using USB as the transport might or might not be supported; if it is not, another transport (e.g., UART or wireless) can be used.

If, at block 628, it is determined that the authentication process failed, then at block 632, the PCD can notify the accessory of the authentication failure, and process 600 can end (block 634). In this case, the PCD can block the accessory from accessing PCD functionality such as commands of the PCD-specific protocol or USB functions such as file access, digital audio transfer, or the like. Unauthorized USB functions can be blocked, e.g., by the PCD refusing to respond to requests from the accessory (or sending error messages in response to such requests) and/or by the PCD not initiating certain USB operations such as audio output. In some embodiments, the PCD can selectively block or permit access to USB functionality regardless of whether it is currently operating in USB host or USB device mode.

It will be appreciated that the process described herein is illustrative and that variations and modifications are possible. Steps described as sequential may be executed in parallel, order of steps may be varied, and steps may be modified, combined, added or omitted. For example, in some embodiments, the accessory and PCD can initially establish communication using a transport other than USB (e.g., UART or a wireless transport) and can perform the authentication process of the PCD-specific protocol before configuring the USB connection. In some embodiments of this kind, the PCD can disregard accessory requests for a particular USB configuration if the authentication fails.

Some embodiments may provide only hardware control of the USB mode (e.g., using an identification resistor), only software control (e.g., using a mode-selection command of a PCD-specific protocol), or a combination of the two. For example, an identification resistor can be used to establish an initial configuration, which can later be changed by a mode-selection command. Alternatively, the PCD can disregard (or treat as error) any received mode-selection command that conflicts with a mode selected based on an identification resistor.

In some embodiments, a PCD operating in USB host mode can support multiple concurrently connected USB devices. If, in such an arrangement, an accessory requests that the PCD switch to USB device mode while other USB devices are connected, the PCD can disregard the request and/or generate an error message to the requesting accessory.

Embodiments described herein thus provide flexible communication between a PCD and a range of different accessories by allowing the PCD to operate in either a USB host or USB device mode and allowing the accessory to signal its preferred mode to the PCD.

While the invention has been described with respect to specific embodiments, one skilled in the art will recognize that numerous modifications are possible. For example, a "PCD" refers generally to any portable electronic device with any form of communication and/or media playback capability; a broad range of functionality may be incorporated. Similarly, the term "accessory" includes any electronic device capable of docking or otherwise connecting with a PCD.

USB is used herein as an example of an asymmetric protocol, where the term "asymmetric protocol" refers generally to a protocol for connecting two electronic devices in which each electronic device plays a distinct role. In the context of USB, the roles are commonly known as "host" and "device," and that terminology is used herein to distinguish two different roles. However, it is understood that a variety of asymmetric protocols exist and the roles can be identified under other nomenclature (such as "master" and "slave" or "A-type" and "B-type" or "first mode" and "second mode"). Techniques similar to those described herein can be applied to any other asymmetric protocol, thus allowing a connected PCD to change its role on a per-connection basis. Accordingly, the present invention is not limited to the context of USB but can be used in connection with any asymmetric protocol and any transport including wired and/or wireless transports.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method for use in a portable communication device, the method comprising:
   establishing, by the portable communication device, a non-USB connection for communication with an accessory using a first set of pins and using a non-USB protocol;
   determining, by the portable communication device, whether a mode-selecting command is received from the accessory via the non-USB connection, wherein the mode-selecting command includes a command code and a parameter specifying whether the portable communication device is to operate in a first mode or a second mode of an asymmetric communication protocol; and
   in the event that the mode-selecting command is received from the accessory, initializing, by the portable communication device, a connection on a second set of pins for communication with the accessory in the mode of the asymmetric communication protocol indicated by the received mode-selecting command,
   wherein the non-USB protocol is a device-specific protocol, the method further comprising:
   initiating an authentication operation with the accessory using the second set of pins according to the device-specific protocol;
   determining whether the authentication operation is successful; and
   in the event that the authentication operation is not successful, blocking the accessory from using at least one function associated with the asymmetric communication protocol.

2. The method of claim 1, wherein the asymmetric communication protocol is a USB protocol.

3. The method of claim 2, wherein the first mode corresponds to a device mode of the USB protocol and the second mode corresponds to a host mode of the USB protocol.

4. The method of claim 1 further comprising: prior to determining whether a mode-selecting command is received from the accessory via the non-USB connection, sending a command to the accessory via the second set of pins indicating the current USB operating mode of the portable communication device.

5. A portable communication device comprising:
a processor; and
an accessory interface coupled to the processor, the accessory interface having a plurality of pins including a first set of pins and a second set of pins, the first set of pins being configured to selectively operate in a first mode or a second mode of an asymmetric communication protocol, the second set of pins being configured to communicate with an accessory using a non-USB protocol, wherein communicating with an accessory using the non-USB protocol includes receiving a mode selection command from the accessory via the non-USB protocol via the second set of pins, wherein the mode selection command includes a command code and a parameter indicating a desired one of the first mode or the second mode; and
wherein the accessory interface is configured to determine, based at least in part on the parameter included in the mode selection command, whether to operate in the first mode or the second mode of the asymmetric communication protocol,
wherein the non-USB protocol is a device-specific protocol, wherein the portable communication device is further configured to:
initiate an authentication operation with the accessory via the second set of pins according to the device-specific protocol;
determine whether the authentication operation is successful; and
in the event that the authentication operation is not successful, block the accessory from using at least one function associated with the asymmetric communication protocol.

6. The portable communication device of claim 5, wherein the asymmetric communication protocol is a USB protocol.

7. The portable communication device of claim 6, wherein the first mode corresponds to a device mode of the USB protocol and the second mode corresponds to a host mode of the USB protocol.

8. The portable communication device of claim 5, wherein the plurality of pins further includes a power input pin and a power output pin, the portable communication device further comprising:
a power control module coupled to the power input pin and the power output pin,
the power control module being configured to receive power from the power input pin when the accessory interface is operating in the first mode of the asymmetric communication protocol and to provide power to the power output pin when the accessory interface is operating in the second mode of the asymmetric communication protocol.

9. A method for use in an accessory, the method comprising:
establishing, by the accessory, a non-USB connection to a portable communication device via a first set of pins, wherein the portable communication device is switchable between a first mode and a second mode of an asymmetric communication protocol;
sending a first command to the portable communication device via the non-USB connection, the first command including a command code and a parameter specifying a first requested mode of operation to be used by the portable media device to communicate with the accessory via a second set of pins, the first requested mode being one of the first mode or the second mode,
wherein in the event that the accessory operates in the first mode of the asymmetric communication protocol, the requested mode is the second mode, and wherein in the event that the accessory operates in the second mode of the asymmetric communication protocol, the requested mode is the first mode; and
communicating with the portable media device via the second set of pins using the asymmetric communication protocol,
wherein the non-USB protocol is a device-specific protocol, the method further comprising:
participating in an authentication operation with the portable communication device using the second set of pins according to the device-specific protocol;
in the event that the authentication operation is successful, using at least one function associated with the asymmetric communication protocol; and
in the event that the authentication operation is not successful, receiving a notification of the authentication failure from the portable communication device.

10. The method of claim 9, wherein the asymmetric communication protocol is a USB protocol.

11. The method of claim 10, wherein the first mode corresponds to a device mode of the USB protocol and the second mode corresponds to a host mode of the USB protocol.

12. The method of claim 9, further comprising:
prior to sending the first command, sending, via the first set of pins, a command to the portable communication device requesting the current mode of the asymmetric communication protocol of the portable communication device.

13. The method of claim 9, further comprising:
prior to sending the first command, selecting the requested mode based at least in part on a current configuration of the accessory.

14. The method of claim 9, further comprising:
sending a second command to the portable communication device, the second command specifying a second requested mode of operation to be used by the portable media device, the second requested mode being different from the first requested mode.

15. An accessory for use with a portable communication device, the accessory comprising:
a controller;
a connector coupled to the controller and adapted to connect to a portable communication device, the connector having a plurality of pins including a first set of pins and a second set of pins;
wherein the controller is configured to provide a mode-selection command to the portable communication device via a non-USB protocol using the first set of pins, wherein the mode-selection command includes a command code and a parameter specifying whether the portable communication device is to operate in the first mode or the second mode of an asymmetric communication protocol using the second set of pins,
wherein the non-USB protocol is a device-specific protocol, wherein the accessory is further configured to:
participate in an authentication operation with the portable communication device using the second set of pins according to the device-specific protocol;
in the event that the authentication operation is successful, use at least one function associated with the asymmetric communication protocol; and in the event that the authentication operation is not successful, receive a notification of the authentication failure from the portable communication device.

16. The accessory of claim 15, wherein the asymmetric communication protocol is a USB protocol.

17. The accessory of claim 16, wherein the first mode corresponds to a device mode of the USB protocol and the second mode corresponds to a host mode of the USB protocol.

18. The accessory of claim 15, wherein the controller is further configured to send, via the first set of pins, a command to request the current mode of the asymmetric communication protocol of the portable communication device.

* * * * *